United States Patent
Kneip et al.

(10) Patent No.: US 6,418,154 B1
(45) Date of Patent: Jul. 9, 2002

(54) PULSED DIODE-PUMPED SOLID-STATE LASER

(75) Inventors: Axel Kneip, Kiel; Ruediger von Elm, Weilen, both of (DE)

(73) Assignee: Coherent, Inc., Santa Clara, CA (US)

(*) Notice: Subject to any disclaimer, the term of this patent is extended or adjusted under 35 U.S.C. 154(b) by 0 days.

(21) Appl. No.: 09/327,147

(22) Filed: Jun. 7, 1999

(51) Int. Cl.[7] .............. H01S 3/10; H01S 3/11; H01S 3/091
(52) U.S. Cl. .............. 372/25; 372/10; 372/75
(58) Field of Search .............. 372/75, 10, 22, 372/25, 26, 38.02, 38.03, 38.06

(56) References Cited

U.S. PATENT DOCUMENTS

| | | | |
|---|---|---|---|
| 3,624,545 A | * 11/1971 | Ross | 372/75 |
| 4,930,901 A | 6/1990 | Johnson et al. | 372/26 |
| 5,291,505 A | 3/1994 | Nielsen | 372/38.03 |
| 5,748,655 A | 5/1998 | Yessik et al. | 372/22 |
| 5,812,569 A | 9/1998 | Walker et al. | 372/30 |
| 6,038,240 A | 3/2000 | Deutsch et al. | 372/25 |

FOREIGN PATENT DOCUMENTS

| | | | |
|---|---|---|---|
| DE | 197 05 330 | 2/1997 | H01S/3/102 |

OTHER PUBLICATIONS

"Notification of Transmittal of the International Search Report or the Declaration," in PCT Appliction No. PCt/US00/06776, Int'l Filing Date Mar. 15, 2000, mailed Jul. 20, 2000, 7 pages in length.

* cited by examiner

*Primary Examiner*—Quyen Leung
(74) *Attorney, Agent, or Firm*—Stallman & Pollock LLP

(57) ABSTRACT

A pulsed, solid laser having a solid-state gain-medium and Q-switch is optically-pumped by a diode-laser array controlled to deliver pump-light pulses to the gain-medium. The Q-switch and the diode-laser array are cooperatively controlled by a controller such that laser output-pulses produced in response to pump-light pulses have the same energy independent of the time-interval between laser output-pulses. Pump-light pulses may be provided by the controller operating a switchable current supply which supplies current-pulses to the diode-laser array for causing pump-light pulses to be delivered to the gain-medium. A controller may also be arranged to drive the diode-laser to provide continuous pump-light output and to operate a light modulator located between the diode-laser array and the gain-medium to cause pump-light pulses to be delivered to the gain medium.

10 Claims, 6 Drawing Sheets

PULSED DIODE-PUMPED SOLID-STATE LASER

TECHNICAL FIELD OF THE INVENTION

The invention relates in general to diode-pumped pulsed solid state (DPSS) lasers. The invention relates in particular to DPSS laser including a Q-switch, and wherein a diode-laser for delivering pump-light pulses is driven by a pulsed or switched power-supply and the Q-switch is synchronously activated at the termination of pump-light pulses.

DISCUSSION OF BACKGROUND ART

Rapidly pulsed DPSS lasers are increasingly being used for precision, fine machining operations in electronics and related industries. Rapidly pulsed, here, refers to a range of pulse repetition rate between about 1 kilohertz (KHz) and several megahertz (MHz). One example of such a machining operation is trimming of resistors using a pulsed Nd:YAG laser at a wavelength of 1064 nanometers (nm). This operation requires the use of variable cutting speeds. When cutting speed is varied, pulse repetition rate must be varied correspondingly to maintain a constant width of cut. In order for a predetermined relationship between pulse repetition rate and cutting speed to be reliable, the energy-per-pulse must remain constant as the pulse repetition rate is varied.

Another example of a use of rapidly pulsed DPSS lasers is engraving images in plastic cards such as identification cards. A pulsed Nd:YAG laser at a wavelength of 1064 nm is also useful in this operation. Typically an image is engraved by laser machining a series of pits having variable spacings therebetween, the real concentration of pits determining the form of the image. Variable spacing is achieved by varying pulse repetition rate at a constant machining speed. Here again, the operation is most effective if the energy-per-pulse remains constant as pulse repetition rate is varied.

Prior-art rapidly-pulsed DPSS lasers are typically continuously pumped, and pulses are formed by repeatedly opening and closing a Q-switch, located in the laser's resonant-cavity. In these prior-art lasers, at pulse-repetition rates greater than about $1/\tau_m$ m (where $\tau_m$ is the characteristic lifetime of excited states of the gain medium), energy-per-pulse is inversely dependent on the pulse-repetition rate. For a gain medium with a relatively long characteristic lifetime such as Nd:YLF, this dependence begins at pulse-repetition rates above about 1 KHz. For a gain-medium with a shorter characteristic lifetime, for example, Nd:YAG, the dependence begins above about 4 KHz.

There is a need for a pulsed-laser which provides laser output-pulses having a constant energy-per-pulse independent of the time-interval between the pulses. Preferably, laser output-pulses should have constant energy-per-pulse even if in a series of laser output-pulses the time interval between pulses varies.

SUMMARY OF THE INVENTION

A pulsed laser in accordance with the present invention provides output-pulses of constant energy-per-pulse, independent of the interval between pulses, even when intervals between pulses are randomly varying.

In one aspect, a laser in accordance with present invention comprises a laser resonant-cavity or laser resonator having a solid-state gain medium. A source of pump-light is provided for energizing the gain medium. The pump-light source is arranged to provide a series of pump-light pulses for energizing the solid-state gain-medium. Each of the pump-light pulses has the same duration, however, the time-period between pump-light pulses is variable.

A Q-switch is located in the resonant-cavity. The Q-switch is arranged to retard operation of the resonant-cavity until a pump-light pulse is terminated. Termination of a pump-light pulse provides a trigger signal for opening the Q-switch, thereby allowing operation of the resonant-cavity for generating a laser output-pulse. The pump-light source has an essentially constant output throughout each pump-light pulse, whereby each laser output-pulse has about the same energy, independent of the time-period between pulses.

Preferably the pump-light source is further arranged to deliver sufficient pump-light to the gain-medium, between termination of each pump-light pulse and initiation of a subsequent pump-light pulse, that gain in the gain-medium is the same at the initiation of each pump-light pulse independent of the time interval between the pump-light pulses.

In one preferred embodiment, the pump-light source is a diode-laser array driven by a regulated current-supply and a controller. The controller is arranged such that the current-supply delivers a series of current-pulses to the diode-laser array. The diode-laser array responsively generates a series of pump-light pulses for energizing the solid-state gain-medium.

The controller is further arranged such that each of the current-pulses and corresponding pump-light pulses has the same duration, and such that the current-pulses and corresponding pump-light pulses may have a variable time-period therebetween. Termination of a current-pulse provides a trigger-signal for opening the Q-switch, thereby allowing operation of the resonant-cavity for generating a laser output-pulse. The controller is further arranged such that the diode-laser array has an essentially constant output throughout each pump-light pulse, whereby each laser output-pulse has about the same energy, independent of the time-period between laser output-pulses.

In another preferred embodiment the pump-light source is a diode-laser array driven by a regulated current-supply and a controller and provides a continuous pump-light output. A light-modulator is located between the diode-laser array and the solid-state gain-medium in the path of the pump-light output of the diode-laser array. The controller is arranged to operate the light-modulator such that the pump-light output from the diode-laser array is delivered to the gain medium as a series of pump-light pulses having the same duration but having a variable time-period therebetween. A Q-switch is located in the resonator, the Q-switch is arranged to retard operation of the resonator until a pump-light pulse is terminated, the termination of the pump-light pulse proves a trigger-signal for opening the Q-switch, thereby allowing delivery by the resonator of a laser output-pulse. The controller is further arranged such that the diode-laser array has an essentially constant output throughout each pump-light pulse, whereby each laser output-pulse has about the same energy, independent of the time-period between laser output-pulses.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
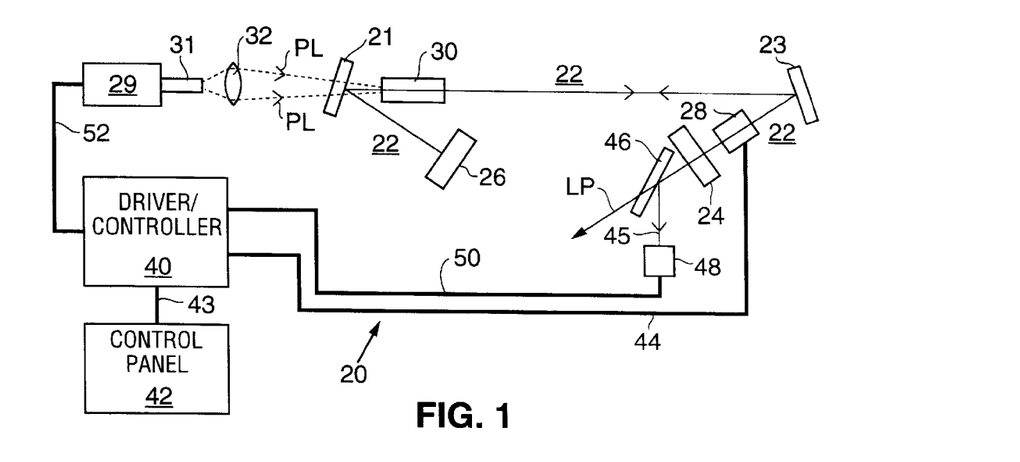
FIG. 1 schematically illustrates one preferred embodiment of a Q-switched, DPSS laser including a laser-diode driver and controller in accordance with the present invention.

Turning now to the drawings, wherein like features are designated by like reference numerals, FIG. 1 depicts one preferred embodiment a pulsed laser 20 in accordance with the present invention. Laser 20 includes a "folded" resonant-cavity or resonator 22 formed between an output-mirror 24 and a maximum reflecting mirror 26. Laser 20 is pumped by a diode-laser array 29. Folding of the resonator is accomplished by mirrors 21 and 23, of which mirror 21 is transparent to light emitted by laser-diode 29. A Q-switch 28, for example, an acoustic optic Q-switch, is located at the end of resonant-cavity 22 closest output-mirror 24. A solid-state gain-medium or crystal 30 is located at the end of resonant-cavity 22 closest to maximum reflecting mirror 26. Gain-medium 30 may, for example, the neodymium-doped yttrium aluminum garnet(Nd:YAG), neodymium-doped yttrium orthovanadate (Nd:YVO$_4$) or neodymium-doped yttrium lithium fluoride (Nd:YLF). These examples, however, should not be considered as limiting the present invention.

Pump-light PL from laser-diode array 29 is delivered by an optical-fiber 31 to a lens 32, and focused by lens 32 through mirror 21 onto gain medium 30 for energizing the gain-medium. It should be noted here that the terminology "diode-laser array", as used in the context of this embodiment of the inventive laser and the appended claims is meant to encompass even a single diode-laser. Further it should be noted that while a so-called end-pumped arrangement is depicted in FIG. 1 for gain-medium 30, principles of the present invention are equally applicable to side-pumped (laterally-pumped) arrangements for solid-state gain-media.

Laser 20 is driven and controlled by a driver/controller 40 (hereinafter controller 40). A control panel 42 is used to provide user instructions to controller 40 via a lead 43. Controller 40 operates Q-switch 28 via a lead 44. A portion 45 of output-power of laser 20 is sampled by a beamsplitter 46 and directed by the beamsplitter to a power monitor 48 such as a photodiode or the like. Output of power monitor 48 is communicated to controller 40 via a lead 50. Controller 40 provides regulated current to diode-laser 29 via a lead 52.

Figure 2:
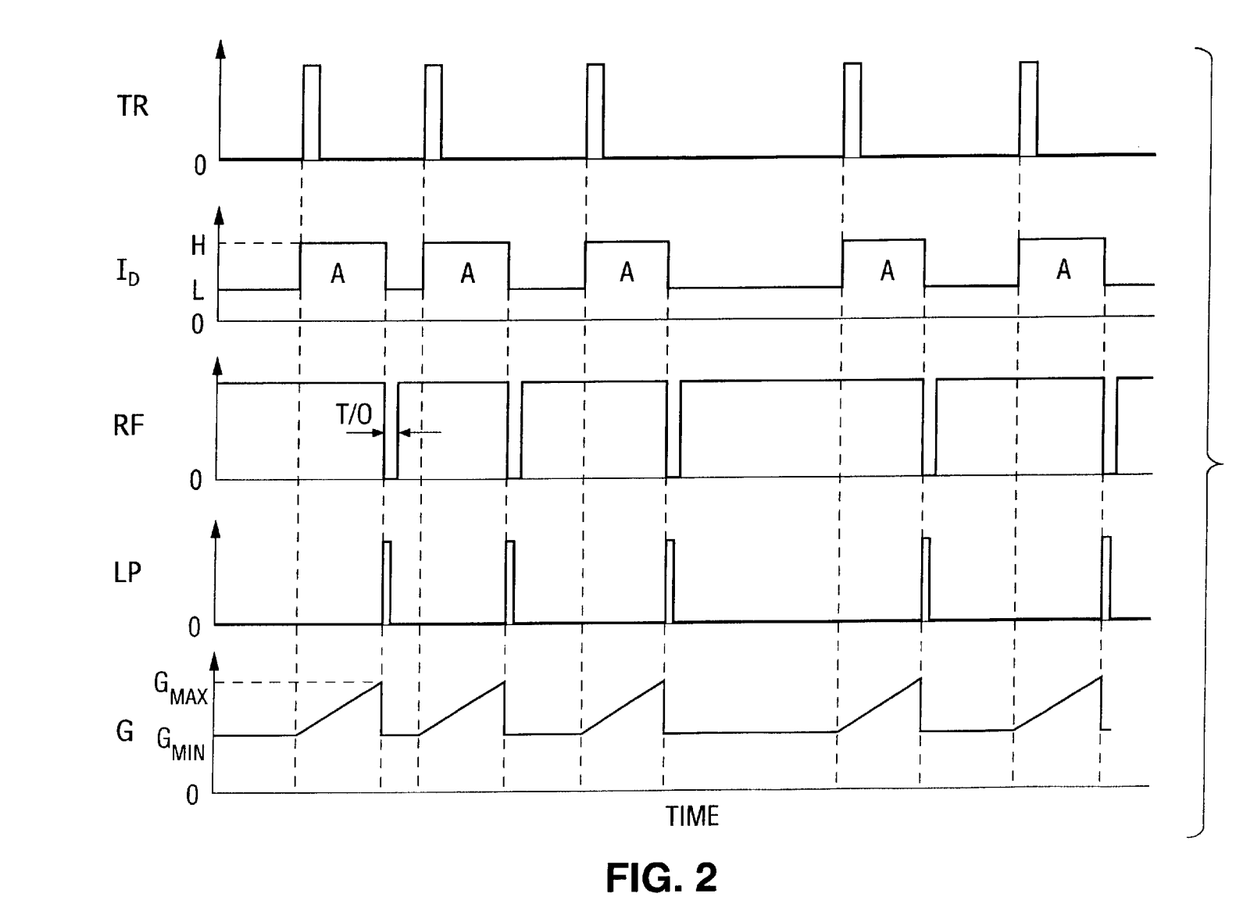
FIG. 2 is a timing-diagram schematically illustrating one preferred temporal relationship of diode-laser current, current-switching signals, Q-switch trigger-signals, laser-gain, and laser output-pulses in the DPSS laser of FIG. 1.

Referring now to FIG. 2, one preferred mode of operation of laser 20 by controller 40 is depicted in the form of a timing diagram. In this mode of operation, laser 20 delivers a series of pulses of essentially equal energy, but having varying time interval therebetween. Diode-laser array 29 is supplied constantly during operation of laser 20 with a essentially-constant low level L of current $I_D$ which generates only sufficient pump-light to maintain gain in gain-medium 30 at a minimum level $G_{MIN}$. After delivery of a laser-pulse, there is some residual gain in a gain-medium, which decays exponentially with time due to fluorescence. Maintaining minimum gain ensures that conditions in the gain-medium are the same at the delivery of each new pump-light pulse regardless of the interval between pump-light pulses.

On receipt of a trigger-signal TR, controller 40 raises current $I_D$ to the diode-laser to an essentially-constant value H for a time-period A and then allows the current to fall to the minimum value. This raised current time-period may be referred to as a pump-pulse (current-pulse) which generates a corresponding pump-light pulse from diode-laser array 29.

It should be noted here, that the terminology "essentially-constant" and "essentially-equal" mean respectively constant or equal within normal limits of electronic control. Further, it should be noted that operation at pulse-repetition rates less than about 200 KHz is contemplated for laser output-pulses delivered by this embodiment of the inventive laser. Accordingly it is assumed that the rise and fall times of current in a current-pulse and pump-light in a corresponding pump-light pulse are negligibly short compared with the total length of the pulses. Operation at higher pulse-repetition rates, however, is not precluded.

From initiation to termination of a current-pulse, i.e., during time-period A, the gain of gain-medium 30 rises from minimum value ($G_{MIN}$), sustained by the level L of diode-laser current $I_d$, to a maximum value ($G_{MAX}$) which is determined by the level H of the diode-laser current and the length of time-period A.

At the end of time-period A, i.e., with the falling-edge (termination) of the current-pulse or pump-pulse, a radio-frequency (RF) signal is switched to zero (switched-off) thereby opening Q-switch 48 and allowing delivery of a laser output-pulse from resonator 22 via mirror 24. The RF signal is switched off for a brief time-period or timeout T/O which is selected to be shorter than the shortest interval between termination of one pump-pulse and initiation of the next.

By operating laser 20 in this manner, the energy in a laser output-pulse is determined entirely by the duration of the pump-pulse. Accordingly, regardless of the time-interval between pump-pulses, in a corresponding series of laser output-pulses, the energy-per-pulse is substantially constant from pulse to pulse. By time-interval between pump-pulses, here, is meant the time-interval between initiation of pump-pulses. In a laser in accordance with the present invention an energy-per-pulse repeatable within about 2 percent or less is achievable.

Figure 3:
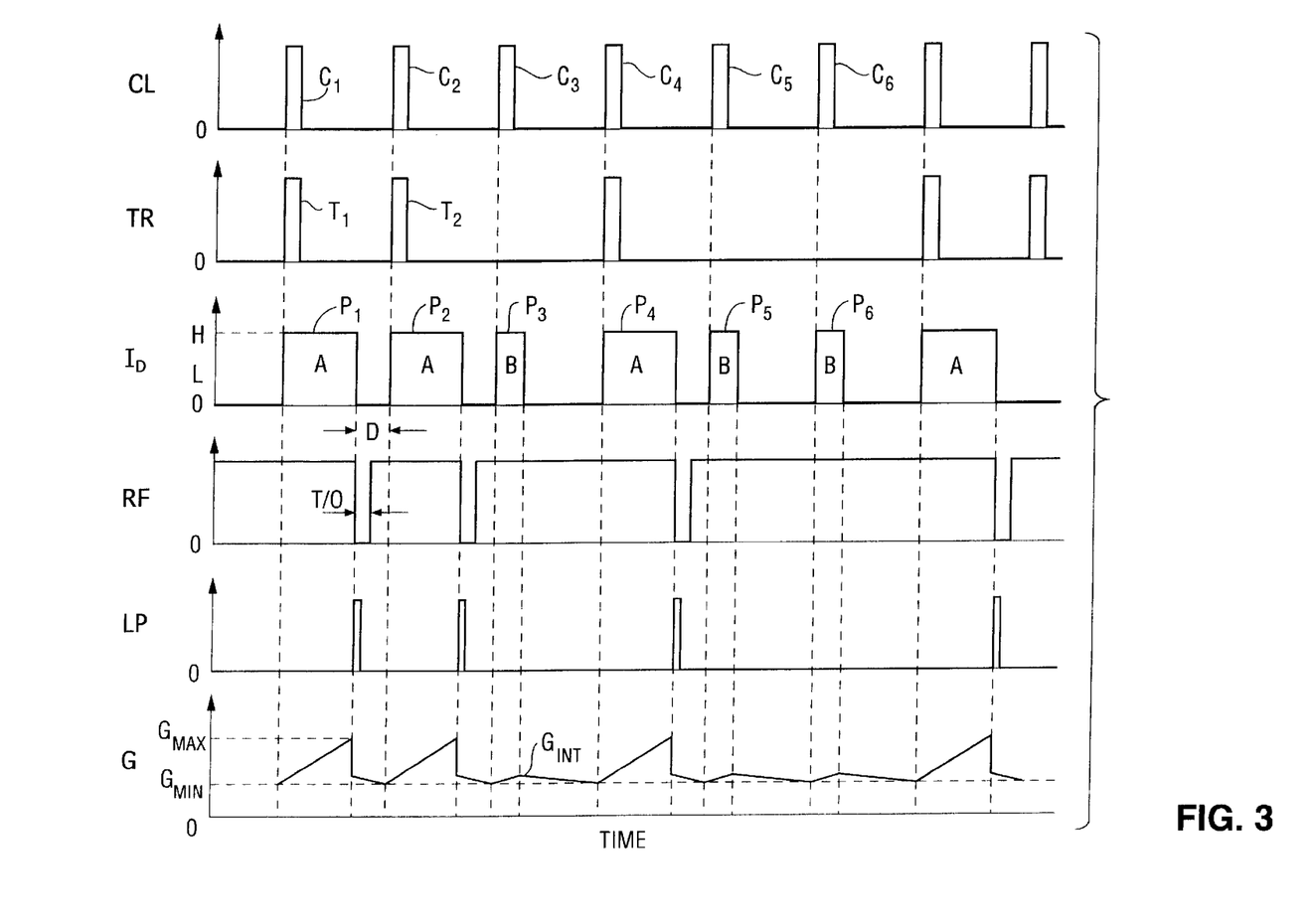
FIG. 3 is a timing-diagram schematically illustrating another preferred temporal relationship of diode-laser current, current-switching signals, Q-switch trigger-signals, laser-gain, and laser output-pulses in the DPSS laser of FIG. 1.

Referring now to FIG. 3 another mode of operation of laser 20 is described, also in the form of a timing-diagram.

In this mode of operation laser 20 provides a series of laser output-pulses representing a digital signal or communication. A train of clock-pulses at regular intervals sets the interval at which a laser-pulse will be delivered (representing a 1), or not delivered (representing a 0). In this mode of operation, diode-laser current $I_D$ is switched only between 0 and the level H required to provide, corresponding to time-period A, the desired energy-per-pulse.

A current-pulse or pump-pulse ($P_1$) of duration A is triggered (clock-pulse $C_1$ and trigger-pulse $T_1$) and a corresponding laser-pulse LP delivered as described above. At the next clock-pulse ($C_2$), another pump-pulse $P_2$ is triggered by trigger-pulse $T_2$. The time-period D between termination of pump-pulse $P_1$ and initiation of pump-pulse $P_2$ is insufficient for gain G to fall completely to zero, and gain G falls to a finite minimum value $G_{MIN}$. At the next clock-pulse $C_3$ a laser-pulse is not required, and no trigger-pulse is generated. Instead, clock-pulse $C_3$ is used to trigger an alternative current-pulse ($P_3$) of a duration B which is shorter than duration A. Current-pulse P3 also causes delivery of a corresponding pump-light pulse of duration B by diode-laser array 29. Current-pulse $P_3$ does not switch off the RF signal to Q-switch 28. Accordingly, no laser output-pulse is generated in response to current-pulse $P_3$ and its corresponding pump-light pulse. This corresponding pump-light pulse serves only to raise the gain in gain-medium 30 to some predetermined value $G_{INT}$ between $G_{MIN}$ and $G_{MAX}$. Current-pulse or pump-pulse $P_3$ may be referred to as a gain-maintenance pulse. As no laser-pulse is delivered to deplete the gain in gain-medium 30 provided by current-pulse $P_3$, a longer interval is required for the gain to fall to minimum value GMIN.

Time-period B of gain-pulses is selected such that $G_{MIN}$ is reached at the initiation of any other pump-pulse. If the next pump-pulse is a pulse of duration A ($P_4$), then gain in gain-medium 30 reaches the value $G_{MAX}$ on termination of the pulse. If at two consecutive clock-pulses ($C_5$ and $C_6$) laser-pulses are not required, consecutive gain-pulses $P_5$ and $P_6$ of duration B are initiated by the clock-pulses, again, with Q-switch 28 closed.

Figure 4:
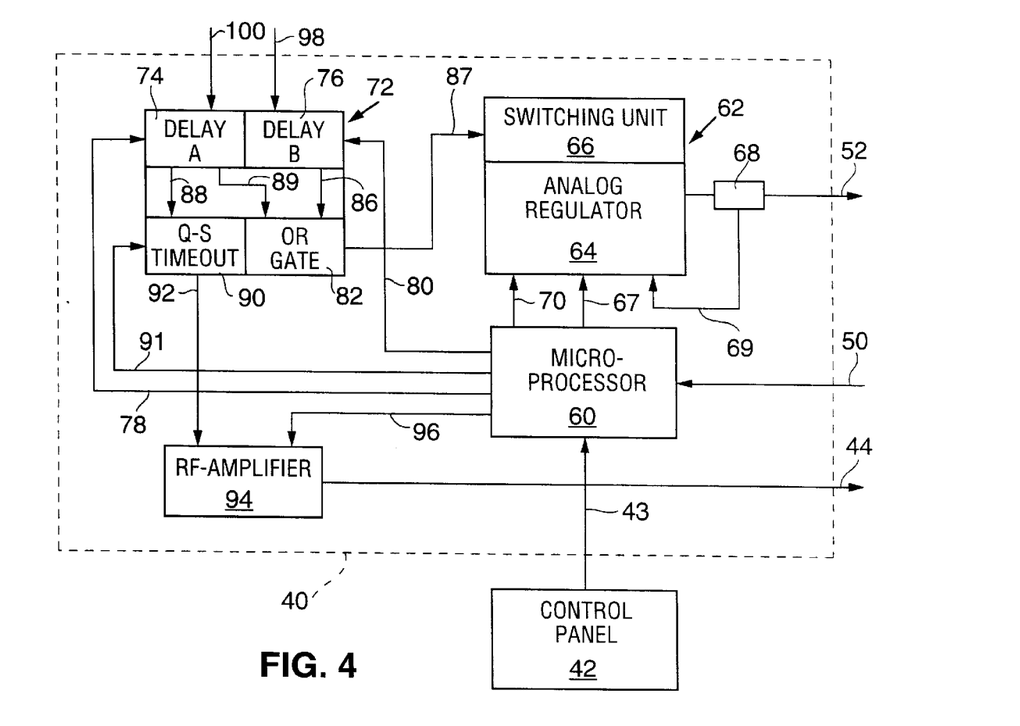
FIG. 4 is a block diagram schematically illustrating functional elements of the driver and controlled of FIG. 1.

FIG. 4 illustrates a preferred arrangement of circuit elements for controller 40. Controller 40 has, as a central control element, a microprocessor 60. Controller 40 also includes a regulated current-supply 62 for diode-laser 29. Current-supply 62 includes an analog current-regulator 64 and a switching unit 66. Microprocessor 60 receives output from power monitor 48 and compares actual output-pulse energy with the desired output-pulse energy. From the comparison, microprocessor 60 sets (via lead 67) a diode-laser current-control setpoint for analog-regulator 64 ($I_D$ of FIG. 2) to a value which will provide the desired output-pulse energy. A current-monitor 68 provides feedback to analog regulator 64, via lead 69, of actual current through diode-laser array 29. Microprocessor 60 also sets (via lead 70) low value L of diode-laser current required for minimum-gain maintenance in the operation mode of FIG. 2.

A logic unit 72 is arranged to perform above-described triggering and switching operations. Logic unit 72 includes delay-generators 74 and 76 for controlling above-described pump-pulse and gain-pulse durations A and B respectively. Durations A and B of delay-generators 74 and 76 are set by microprocessor 60 through trigger signals delivered to the delay-generators via leads 78 and 80 respectively. Delay-generators 74 and 76 each communicate with an OR-gate 82 via leads 84 and 86 respectively. Either communication will operate switching unit 66, via lead 87, for providing above-described pump-pulses or gain-pulses.

If delay generator 74 is triggered (via lead 100), at the end of the delay-period, i.e., on termination of the corresponding current-pulse, a signal is transmitted via lead 88 to a Q-switch timeout generator 90. Timeout generator 90 is connected via lead 92 to an RF-amplifier 94. On receipt of the delay-termination (falling-edge) signal from delay generator 74, timeout generator 90 turns RF-amplifier off thereby opening Q-switch 28 for delivery a laser-pulse. Timeout interval T/O, for which Q-switch 28 is open, is set by microprocessor 60 via a lead 91. The RF-amplitude of RF-amplifier 94 is set by microprocessor 60 via lead 96. If delay-generator 76 is triggered (via lead 98), no signal is transmitted to timeout generator 90. Accordingly Q-switch 28 remains closed during delivery of above-described gain-pulses.

In the foregoing description of controller 40, clock and trigger signals may be externally supplied to logic unit 72 via leads 98 and 100 respectively. Such externally-supplied signals may be supplied, for example, from a cooperative apparatus, or from a personal computer or the like. A trigger signal for delay generator 74 may even be delivered from something as simple as a manually-operated switch or button.

In one example of a pulsed solid-state laser in accordance with the above described first embodiment of the present invention, arranged to operate in accordance with the timing scheme of FIG. 2, a $YVO_4$ gain-medium is end-pumped by 808 nm radiation from an 8.0 watt fiber array package. The laser provides better than 2% RMS repeatability of energy-per-pulse over a range of pulse energies between about 10.0 and 20.0 microjoules per pulse ($\mu J$/pulse) at a range of pulse repetition-rates between about 55 kHz and 85 kHz. Those skilled in the art will recognize from the description of the present invention presented herein that principles of the present invention are applicable to lasers including different gain-media with different pulse energies and repetition rates. Accordingly, the above exemplified pulse energies and repetition rates should not be construed as limiting the present invention.

Figure 5:
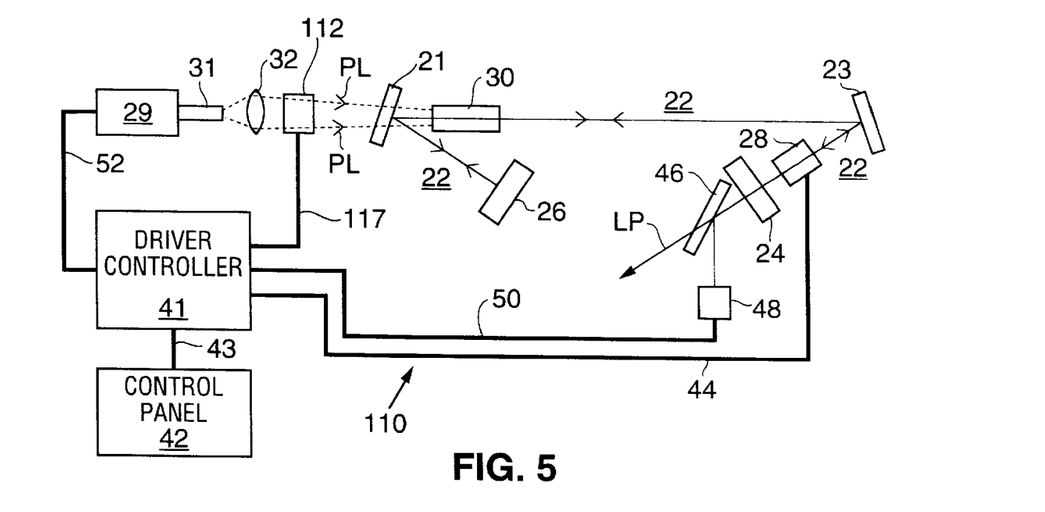
FIG. 5 schematically illustrates another preferred embodiment of a Q-switched, DPSS laser in accordance with the present invention including a diode-laser pump-light source, a light-modulator for modulating output of the pump-light source and a laser-diode driver and controller.

Referring now to FIG. 5, another embodiment 110 of a pulsed-laser in accordance with the present invention is illustrated. Components of laser 110 is similar in most respects with those of laser 20 with the exception that a light-modulator 112, such as an acousto-optic modulator (AOM) or an electro-optic modulator (EOM) is added between diode-laser array 29 and mirror 21, i.e., between diode-laser array 29 and gain-medium 30. This embodiment is preferred for operating at pulse-repetition rates greater than 200 KHz and up to several MHz, operation, however, is not limited to these high rates.

Switching a regulated power supply at sufficiently high frequency for providing these high pulse-repetition rates becomes difficult, and the rise and fall time of current pulses as percentage of a pulse duration can no longer be assumed to be insignificant. This is overcome in laser 110 by operating diode-laser array 29 to provide continuous pump-light output and modulating the pump-light output of the diode-laser array with light-modulator 112. Modulation of the light-output of diode-laser array 29 provides that pump-light is delivered to gain-medium 30 as pump-light pulses, and operation of Q-switch 24 is performed synchronously with the falling edge of a pump-light pulse as in laser 20. Driver and controller 41 (described in detail further hereinbelow) is similar to driver and controller 40 of laser 20 but is modified for driving light-modulator 112 to produce pump-light pulses.

Figure 6:
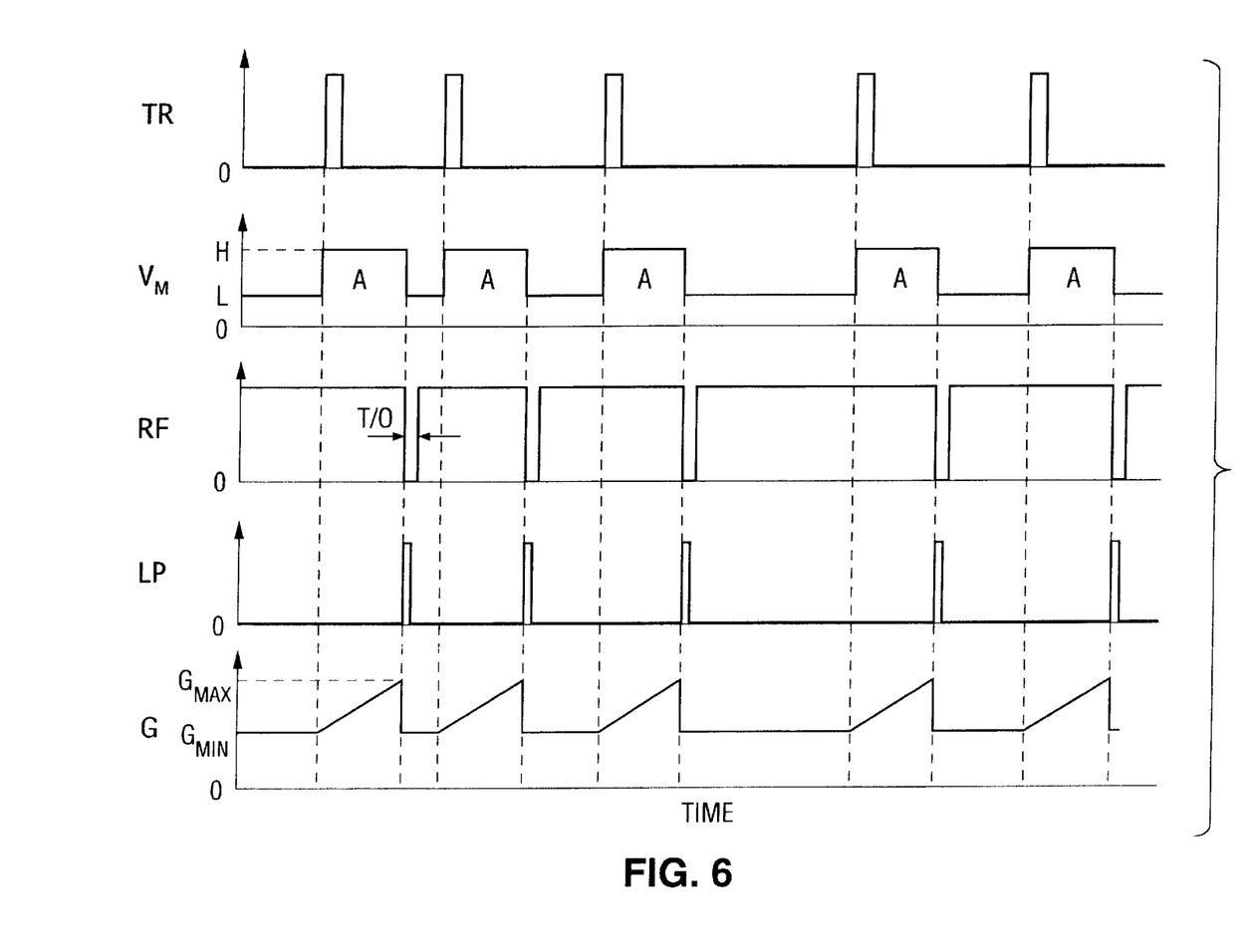
FIG. 6 is a timing-diagram schematically illustrating one preferred temporal relationship of light-modulator voltage, voltage-switching signals, Q-switch trigger-signals, laser-gain, and laser output-pulses in the DPSS laser of FIG. 5.
Figure 7:
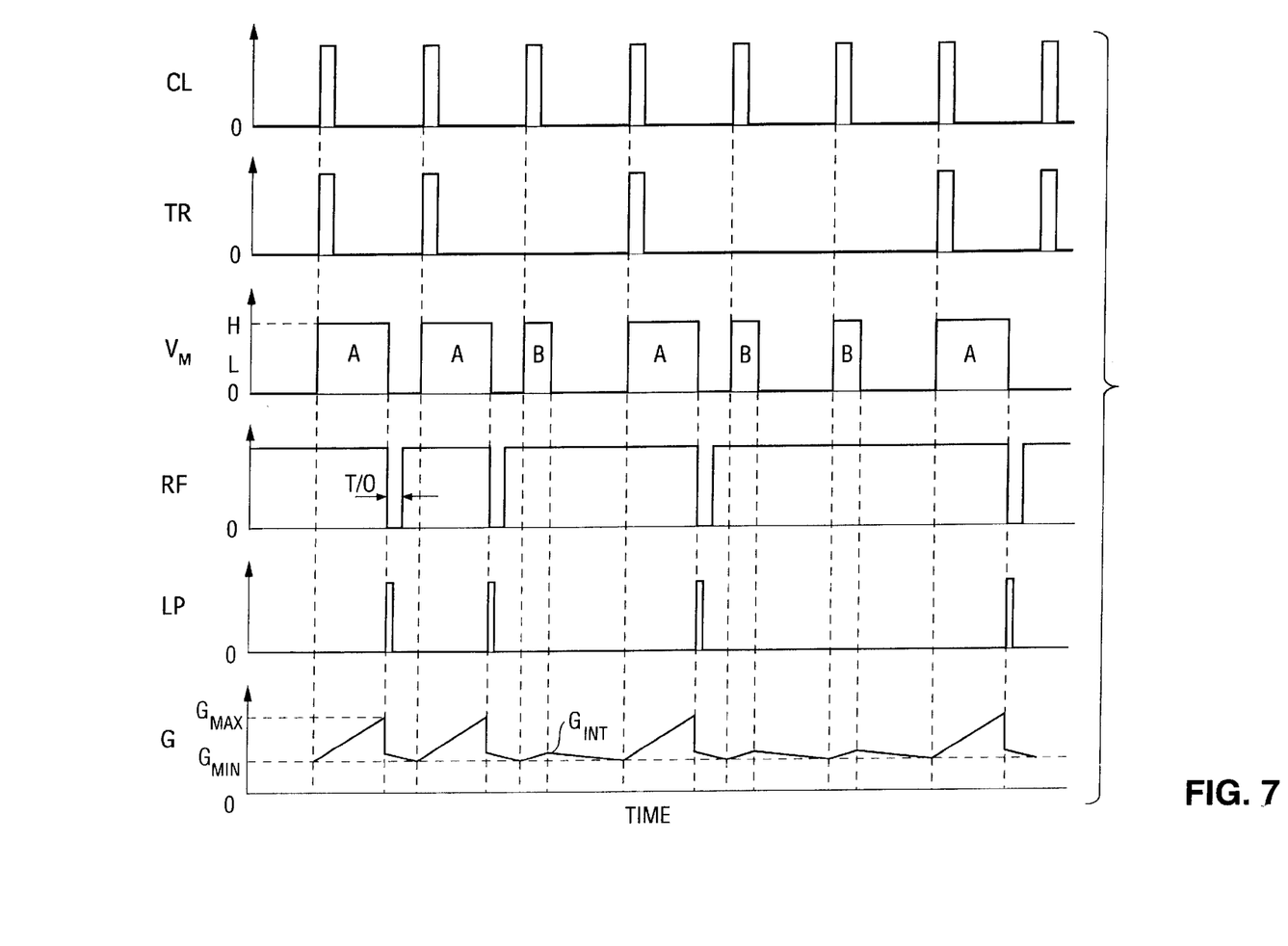
FIG. 7 is a timing-diagram schematically illustrating another preferred temporal relationship of light-modulator voltage, voltage-switching signals, Q-switch trigger-signals, laser-gain, and laser output-pulses in the DPSS laser of FIG. 1.

FIGS. 6 and 7 are timing diagrams corresponding to above-discussed timing diagrams of FIGS. 2 and 3 respectively. It can be seen that the only difference is that diode-laser current $I_D$ of FIGS. 2 and 3 is replaced with a light-modulator voltage $V_M$. Temporal relationship of signals is otherwise identical.

Figure 8:
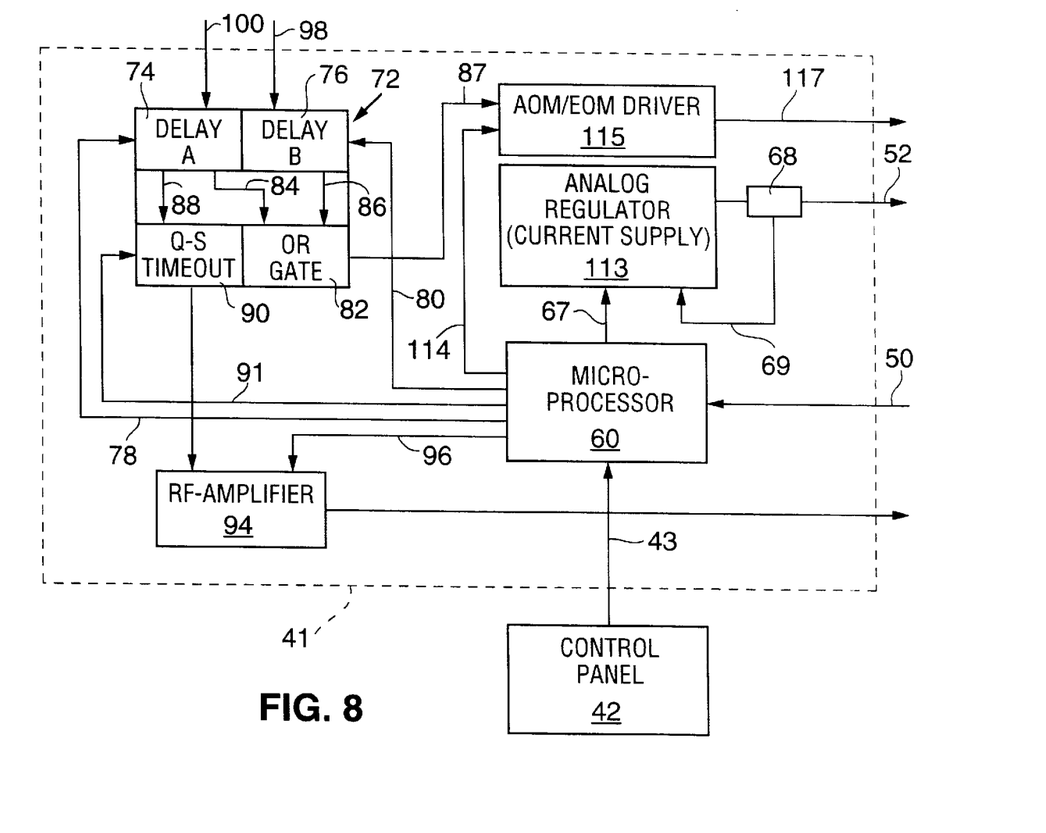
FIG. 8 is a block diagram schematically illustrating functional elements of the driver and controller of FIG. 5.

FIG. 8 illustrates a preferred arrangement of circuit elements for controller 41. This is similar in most respects and functions to controller 40 of FIG. 4 with the following exceptions. The switched current-supply 62 of controller 40 is, in controller 41, simply a regulated current supply 113. The maximum level of a pump-light pulse is determined by a maximum diode-laser current communicated to current supply 113 via lead 67. Switching unit 66 of controller 40 is replaced, in controller 41, by an AOM/EOM driver 115, which is a regulated voltage source. AOM/EOM driver 115 receives switching signals from logic unit 72 via lead 87.

The minimum gain of FIG. 6 is provided in that light-modulator 112 (see FIG. 1) is not completely opaque at its minimum transmission. This minimum transmission, and, accordingly minimum gain, is established by a corresponding voltage delivered from AOM/EOM driver 115 via lead 117. This minimum voltage is set by microprocessor 60 via lead 114.

The present invention is described above in terms of a preferred and other embodiments. The present invention is not limited, however, by the embodiments described and depicted. Rather, the invention is limited only by the claims appended hereto.

What is claimed is:

1. A laser, comprising:
   a laser resonator having a solid-state gain medium;
   a source of pump-light for energizing said gain medium, said pump-light source arranged to provide a series of pump-light pulses for energizing said solid-state gain-medium, each of said pump-light pulses having the same duration, and said pump-light pulses having variable time-periods therebetween;
   a Q-switch located in said laser resonator, said Q-switch arranged to retard operation of said laser resonator until one of said pump-light pulses is terminated, said termination of said pump-light pulse providing a trigger signal for opening said Q-switch thereby allowing delivery by said laser resonator of a laser output-pulse responsive to said pump-light pulse; and
   said pump-light source having an essentially constant output throughout each pump-light pulse, and said pump-light source being further arranged to deliver sufficient additional pump-light to said gain-medium, between termination of each said pump-light pulse and initiation of a subsequent pump-light pulse, with said Q-switch arranged to prevent generation of laser radiation in response to said delivery, such that gain in said gain-medium is the same at the initiation of each pump-light pulse independent of the time interval between said pump-light pulses, whereby each laser output-pulse has about the same energy, independent of the time-period between laser output-pulses.

2. The laser of claim 1, wherein said pump-light source is one of a diode-laser and a diode-laser array.

3. The laser of claim 2, wherein said gain-medium is a gain-medium selected from the group of gain media consisting of Nd:YAG, Nd:YV0$_4$ and Nd:YLF.

4. A laser, comprising:
   a laser resonator including a solid-state gain medium;
   a diode-laser array driven by a regulated current-supply and a controller;
   said controller arranged such that said current-supply delivers a series of current-pulses to said diode-laser array, said diode-laser array generating a series of pump-light pulses responsive to said series of current-pulses for energizing said solid-state gain-medium;
   said controller further arranged such that each of said current-pulses and and corresponding pump-light pulses has the same duration, and such that said current-pulses and corresponding pump-light pulses have a variable time-period therebetween;
   a Q-switch located in said laser resonator, said Q-switch arranged to retard operation of said laser resonator until one of said current-pulses is terminated, said termination of said current-pulse providing a trigger-signal for opening said Q-switch, thereby allowing delivery by said laser resonator of a laser output-pulse; and
   said controller further arranged such that said diode-laser array has an essential constant output throughout each pump-light pulse and also arranged such that said current-supply provides a predetermined minimum level of current to said diode-laser array between said current-pulses with said Q-switch closed to prevent generation of laser radiation in the resonator, said minimum level of current being such that said diode laser array provides sufficient additional pump-light to said gain-medium between said pump-light pulses, without generating laser radiation, to maintain a predetermined minimum gain level in said gain-medium, whereby each laser output-pulse has about the same energy, independent of the time-period between laser output-pulses.

5. The laser of claim 4, wherein said gain-medium is a gain-medium selected from the group of gain media consisting of Nd:YAG, Nd:YV0$_4$ and ND:YLF.

6. The laser of claim S wherein said laser output-pulses are delivered at a pulse-repetition rate less than about 200 kilohertz.

7. A laser, comprising:
   a laser resonator including a solid-state gain medium;
   a diode-laser array driven by a regulated current-supply and a controller;
   said controller arranged such that said current-supply delivers, a series of current-pulses to said diode-laser array, said diode-laser array responsively generating a series of pump-light pulses for energizing said solid-state gain-medium;
   said controller further arranged such that there is a constant tie-interval between initiation of each of said current-pulses and corresponding pump-light pulses and such that each of said current-pulses and corresponding pump-light pulses has one of a first duration and a second duration, said second duration being shorter than said first duration, and said constant time-interval being defined as a clock-period;
   a Q-switch located in said laser resonator, said Q-switch arranged to retard operation of said laser resonator until one of said current-pulses of said first duration is terminated, said termination of said first-duration current-pulse providing a trigger-signal for opening said Q-switch, thereby allowing delivery by said laser resonator of a laser output-pulse; and
   said Q-switch remaining closed on termination of said current pulses of said second duration, and said first and second pulse durations being selected such that residual gain in said gain-medium is the same at the initiation of each current-pulse, whereby said laser output-pulses have a time-interval therebetween equal to an integer multiple of said clock-period and each of said laser output-pulses has about the same energy, independent of the time-interval therebetween.

8. A laser, comprising:

a laser resonator including a Q-switch, and a solid-state gain-medium;

a diode-laser array for optically pumping said gain-medium, said diode-laser array being driven by a switchable, regulated current-supply and a controller;

said current-supply controlled by said controller to initiate delivery of current-pulses to said diode-laser array, said diode-laser array correspondingly providing pump-light pulses responsive to said current-pulses for optically pumping said gain-medium;

said current-pulses and corresponding pump-light pulses being of essentially constant magnitude and duration, and between said pump-light pulses said current-supply being controlled by said controller such that said diode-laser array provides sufficient additional pump-light to said gain-medium, with said Q-switch closed to prevent generation of laser radiation, such that gain in said gain-medium is the same at the initiation of each pump-light pulse; and said Q-switch being arranged cooperative with said controller and said current-supply such that said Q-switch is opened at the termination of each current-pulse for delivering a laser output-pulse from said laser resonator, whereby in a series of said laser output-pulses delivered by said laser resonator, each thereof has the same energy independent of the time-interval therebetween.

9. A laser, comprising:

a laser resonator including a solid-state gain medium;

a diode-laser array driven by a regulated current-supply and a controller and provide a continuous pump-light output;

a light-modulator located between said diode-laser array and said solid state gain-medium in the path of said pump-light output of said diode-laser array;

said controller arranged to operate said light-modulator such that said pump-light output from said diode-laser array is delivered to said gain medium as a series of pump-light pulses for exciting said gain medium;

said controller further arranged that there is a constant time-interval between initiation of each of said pump-light pulses and such that each of said pump-light pulses has one of a first duration and a second duration, said second duration being shorter than said first duration, and said constant time-interval defined as a clock-period;

a Q-switch located in said laser resonator, said Q-switch arranged to retard operation of said laser resonator until one of said pump-light pulses of said first duration is terminated, said termination of said first-duration pump-light pulse providing a trigger-signal for opening said Q-switch, thereby allowing delivery by said laser resonator of a laser output-pulse; and said Q-switch remaining closed on termination of said current pulses of said second duration, and said fist and second pump-light pulse durations being selected such that residual gain in said gain-medium is the same at the initiation of each pump-light pulse, whereby said laser output-pulses have a time-interval therebetween equal to an integer multiple of said clock-period and each of said laser output-pulses has about the same energy, independent of the time-interval therebetween.

10. The laser of claim 9, wherein said laser output-pulses are delivered at a pulse-repetition rate greater than about 200 kilohertz.

* * * * *